(12) United States Patent
Kerrom et al.

(10) Patent No.: US 8,915,146 B2
(45) Date of Patent: Dec. 23, 2014

(54) MAGNETO-INDUCTIVE FLOW MEASURING DEVICE HAVING A SECUREMENT MEANS TO SECURE AN ELECTRODE TO THE MEASURING TUBE

(75) Inventors: Roger Kerrom, Lorrach (DE); Beat Tschudin, Reinach (CH); Raphel Hess, Grellingen (CH)

(73) Assignee: Endress + Hauser Flowtec AG, Reinach (CH)

( * ) Notice: Subject to any disclaimer, the term of this patent is extended or adjusted under 35 U.S.C. 154(b) by 669 days.

(21) Appl. No.: 13/003,830

(22) PCT Filed: Jul. 27, 2009

(86) PCT No.: PCT/EP2009/059624
§ 371 (c)(1),
(2), (4) Date: Jan. 12, 2011

(87) PCT Pub. No.: WO2010/015532
PCT Pub. Date: Feb. 11, 2010

(65) Prior Publication Data
US 2011/0113895 A1 May 19, 2011

(30) Foreign Application Priority Data

Aug. 8, 2008 (DE) .......................... 10 2008 036 962

(51) Int. Cl.
*G01F 1/56* (2006.01)
*G01F 1/58* (2006.01)
*G01F 15/14* (2006.01)

(52) U.S. Cl.
CPC ................ *G01F 1/584* (2013.01); *G01F 15/14* (2013.01)

USPC ........................................................ 73/861.12

(58) Field of Classification Search
None
See application file for complete search history.

(56) References Cited

U.S. PATENT DOCUMENTS

| 3,813,938 | A | * | 6/1974 | Grosch et al. | 73/861.12 |
| 4,388,834 | A |   | 6/1983 | Schmoock |  |
| 4,912,838 | A | * | 4/1990 | Goto et al. | 73/861.12 |
| 5,224,394 | A | * | 7/1993 | Kalinoski | 73/861.12 |
| 5,269,191 | A | * | 12/1993 | Wada | 73/861.12 |
| 6,094,992 | A | * | 8/2000 | Mesch et al. | 73/861.15 |
| 6,195,013 | B1 | * | 2/2001 | Robinson | 340/623 |
| 2006/0174716 | A1 | * | 8/2006 | Zajac et al. | 73/861.12 |
| 2009/0056471 | A1 | * | 3/2009 | Keese | 73/861.12 |
| 2010/0024568 | A1 | * | 2/2010 | Diederichs | 73/861.12 |
| 2010/0089171 | A1 | * | 4/2010 | Voigt et al. | 73/861.12 |
| 2010/0132478 | A1 | * | 6/2010 | Pelayo | 73/861.12 |
| 2013/0086993 | A1 | * | 4/2013 | Kerrom et al. | 73/861.12 |

FOREIGN PATENT DOCUMENTS

| JP | 56-164917 | 12/1981 |
| JP | 07 005 003 A | 1/1995 |

* cited by examiner

*Primary Examiner* — Harshad R Patel
(74) *Attorney, Agent, or Firm* — Bacon & Thomas, PLLC

(57) ABSTRACT

A magneto-inductive flow measuring device having a measuring transducer, which includes a measuring tube a magnet system for producing a magnetic field, and at least one electrode inserted into a bore of the measuring tube for registering an electrical voltage. A securement device is provided, which serves for securing the electrode on the measuring tube. The securement device is at least partially composed of plastic, and is connected with the measuring tube by a plastics welding technology.

11 Claims, 2 Drawing Sheets

MAGNETO-INDUCTIVE FLOW MEASURING DEVICE HAVING A SECUREMENT MEANS TO SECURE AN ELECTRODE TO THE MEASURING TUBE

TECHNICAL FIELD

The invention relates to a magneto-inductive flow measuring device having a measuring transducer, wherein the measuring transducer includes a measuring tube, through which a measured substance can flow, a magnet system for producing a magnetic field, and at least one electrode inserted into the measuring tube for registering a voltage.

Furthermore, the invention relates to a method for the manufacture of a magneto-inductive flow measuring device, wherein the magneto-inductive flow measuring device includes a measuring tube, wherein the measuring tube has at least one bore, wherein an electrode is installed into the bore.

BACKGROUND DISCUSSION

For volumetric flow measurement, magneto-inductive flow measuring devices utilize the principle of electrodynamic induction: charge carriers of the medium moved perpendicularly to a magnetic field induce a voltage in electrodes arranged essentially perpendicular to the flow direction of the medium and perpendicular to the direction of the magnetic field. The measurement voltage induced in the electrodes is proportional to the flow velocity of the medium averaged over the cross section of the measuring tube, and, thus, proportional to the volume flow rate. If the density of the medium is known, the mass flow in the pipeline or the measuring tube can be determined. The measurement voltage is usually tapped via the electrode pair, which is arranged in the region of the measuring tube in which the maximum magnetic field strength and, thus, the maximum measurement voltage is to be expected. The electrodes are usually galvanically coupled with the medium; however, magneto-inductive flow measuring devices with contactless, capacitively coupling electrodes are also known.

The measuring tube can, in such case, be manufactured either from an electrically conductive material, e.g. stainless steel, or from an electrically insulating material. If the measuring tube is manufactured from an electrically conductive material, the portion coming in contact with the medium must then be lined with a liner made from an electrically insulating material. The liner is, depending on temperature and medium, for example, made of a thermoplastic, a thermosetting plastic or an elastomeric, synthetic material. However, magneto-inductive flow measuring devices with a ceramic lining are also known.

An electrode can essentially be subdivided into an electrode head, which at least partially comes in contact with a medium flowing through the measuring tube, and an electrode shank, which is almost completely encased in the wall of the measuring tube.

The electrodes are, along with the magnet system, the central components of a magneto-inductive flow measuring device. With regard to the embodiment and arrangement of the electrodes, it is to be ensured that they can be installed in the measuring tube as easily as possible, and that, subsequently during measurement operation, no leakage problems occur; moreover, the electrodes should be characterized by a simultaneously sensitive, and low-disturbance, registering of measurement signals.

In addition to the measuring electrodes, which serve for picking up a measurement signal, additional electrodes in the form of reference or grounding electrodes, which serve to measure an electrical reference potential or to detect partially filled measuring tubes, are often installed in the measuring tube.

U.S. Pat. No. 4,279,166 shows an electrode arrangement of a magneto-inductive flow measuring device for sealing an insert into the flow measuring device. The sealing is achieved, in such case, essentially by a threaded cap, which is screwed onto a screw thread of the insert, and the electrode is affixed in the insert. The arrangement is sealed by an O-ring placed under the shoulder of the electrode.

U.S. Pat. No. 5,224,394 also shows an arrangement for sealing electrodes inserted into the wall of a ceramic measuring tube of a magneto-inductive flow measuring device. For such purpose, the electrode is held in a particular position by a spring, so that the electrode seals off the measuring tube.

U.S. Pat. No. 3,171,990 shows an arrangement for securement of electrodes in a measuring tube. In such case, the electrode is inserted in an insert into the measuring tube, and affixed in assembly by means of a nut and a screw thread on the electrode shank.

These embodiments have, however, the disadvantage, that the radial bores in the measuring tube form weak points, which, in the case of measured substances flowing through under high pressure, lead to cracks and failures. Furthermore, in the case of small nominal diameters of measuring tubes, it is difficult to install the electrodes in the measuring tube and to seal the bores.

Additionally, in the case of measuring tubes made of plastic or synthetic material, the conventional types of securement of electrodes in the measuring tube used in the state of the art are not practical.

SUMMARY OF THE INVENTION

An object of the invention, therefore, is to provide a magneto-inductive flow measuring device and a method for the manufacture of a magneto-inductive flow measuring device, in the case of which the electrode is secured liquid-tightly in and, respectively, to the measuring tube.

With regard to the magneto-inductive flow measuring device, the object is achieved according to the invention by features including that: A securement means is provided, which serves for securing the electrode to the measuring tube; the securement means is composed at least partially of plastic; and the securement means is connected with the measuring tube by a plastics welding technology. By the plastics welding technology, preferably, a non-releasable, material-bonded connection is achieved. Welded connections have high strength in comparison to other connections. In the welding, the components, securement means and measuring tube are locally melted in a joint zone by application of heat and/or force, and, by solidification of the melted region, non-releasably connected with one another. This offers the advantage, that the bore, into which the electrode is applied, becomes sealed to pressure and sealed to liquid. Furthermore, a shaking of the electrode in the bore under operating conditions is thereby suppressed; i.e. the electrode is secured, playfree, in the bore. In this way, disturbances in the measurement signal—among other things, the so-called electrode noise—are reduced.

In an advantageous further development, the measuring tube is at least partially composed of plastic. In this way, a higher strength is achieved for the welded connection. Additionally, in comparison to materials made from metal, plastic is less expensive. Today, polymers mixed with suitable composite-forming materials have high strength, as well as high corrosion resistance.

In an advantageous, further development, the electrode includes a flange, with which the electrode lies against the measuring tube. Preferably, the flange extends radially to the longitudinal axis of the electrode. By way of the flange, the electrode can be held in a desired position, preferably perpendicular to the longitudinal axis of the measuring tube. Furthermore, because of the flange, the electrode is only insertable into the wall of the measuring tube to such a degree, that the flange lies against the measuring tube. In this way, during installation, a penetration of the electrode into the barrel of the measuring tube is prevented, and the flow profile of the measured substance flowing through the measuring tube is not disturbed.

In an advantageous, further development, the measuring tube includes a bore surrounded by a seat, wherein the electrode is inserted into the bore. The seat is, for example, part of the measuring tube or an insert inserted into the measuring tube. The seat is composed, for example, of a collar-like attachment, which extends radially to the longitudinal axis of the measuring tube and protrudes out of the measuring tube.

In an additional advantageous embodiment, the measuring tube is composed, at least in the region of the seat, of plastic. Via the connection between the securement means and seat, an especially solid structure is thus formed. A seat composed of plastic thus enables the conversion of a metal measuring tube, which is lined with a liner, to a magneto-inductive flow measuring device of the invention.

In an advantageous, further development, the securement means is connected with the seat. Through the securement means being connected with the seat by means of plastics welding technology, the electrode is affixed to the measuring tube and the measuring tube is sealed. Preferably, the electrode is surrounded by the securement means in the region of the electrode shank and/or on the end facing away from the electrode head.

In an advantageous, further development, the securement means lies at least partially on the flange of the electrode. Provided as securement means is, for example, a disk or a ring, which are placed on the flange. Through the pressure of the securement means on the flange of the electrode, the electrode is pressed into the bore and emplaced in a desired position.

In an advantageous, further development, the flange of the electrode lies at least partially on the seat. By way of plastics welding technology, the securement means can be connected with the seat and the measuring tube can be sealed. In this way, the electrode is positively inserted in the position provided for it, and forms, furthermore, an additional sealing stage, for sealing the bore.

In an advantageous, further development, the plastics welding technology is one of the following technologies: Ultrasonic, resistance, stud, laser, electron beam, friction and/or heat welding technology. Heat production for manufacturing the connection occurs, for example, via heating elements, electrical current, friction, laser or electron beam. By means of plastics welding technology, especially non-releasable, material-bonded connections can be produced between components made of thermoplastic plastics.

In an advantageous, further development, the securement means is embodied in such a manner, that, due to the securement means, the electrode is arranged in a desired position. The securement means comprises, for example, a cap, which is placed on the seat and accommodates the flange of the electrode. Through the securement means, which is fitted to the contour of the electrode with its flange, an exact-fitting of the securement means is achieved and therewith an electrode arrangement of the magneto-inductive flow measuring device of the invention which is sealed on all sides to liquid and/or to pressure.

In an advantageous, further development, the electrode has at least one sealing element, which seals the measuring tube in the region of the bore. For such purpose, the sealing element is preferably placed on the electrode shank in a region below the flange of the electrode, and thus prevents the measured substance from leaving the measuring tube.

In an advantageous, further development, the electrode comprises an electrode head and an electrode shank, and the sealing element is partially inserted into a cavity of the electrode shank. The sealing element prevents the measured substance from leaving the measuring tube through the bore. Preferably, the sealing element protrudes out from the surface of the electrode shank, and seals a gap present between the bore and the electrode shank.

Additionally, a further sealing element can be provided between the securement means and the electrode in the region of the flange of the electrode, above the seat.

In an additional advantageous embodiment, at least one weld lip and/or a mash joint is provided on the securement means and/or on the measuring tube, wherein the weld lip and/or the mash joint serve to affix the securement means to the measuring tube. In given cases, the weld lip or the mash joint can also be placed on the seat. The weld lip and mash joint involve so-called joint zones. The joint zones of the welded connection are of decisive importance for the loading capacity of the connection, especially in the case of ultrasound welding technology. Furthermore, in the case of ultrasound welding technology, the joint zones serve as energy directors, through which a targeted and concentrated energy discharge is achieved. The mash joint is preferably used for manufacturing sealed and high-strength welded connections.

With regard to the method, the object is achieved according to the invention by features including that: The electrode is secured to the measuring tube by means of a plastics welding technology. By the plastics welding technology, the components, securement means and measuring tube are connected with one another in a material-bonding manner. Preferably, the bore in the measuring tube is sealed thereby, and the electrode is affixed in the bore and to the measuring tube. For such purpose, ultrasonic, resistance, stud, laser, electron beam, friction and/or heat welding technology can be used.

In an advantageous, further development, the electrode is held in a desired position by a seat provided on the measuring tube; furthermore, the electrode has a flange, which is placed on the seat; a securement means made of plastic is placed on the flange, wherein the securement means lies at least partially on the seat; and the securement means is connected by means of plastics welding technology with the measuring tube.

In an embodiment of the method of the invention, especially, a cylindrical electrode with a flange is inserted into a prefabricated bore in the measuring tube, until the flange lies against the measuring tube or on the seat. In given cases, a securement means made of plastic, which has specially formed weld lips or a mash joint, is pushed over the flange. The securement means can thereupon be connected with the seat or the measuring tube by means of plastics welding technology.

For performing the method, especially, devices for ultrasonic welding can be applied. The ultrasonic welding devices are used for the material-bonded joining of thermoplastic synthetic materials. In DIN 1910, Part 3, the ultrasonic welding of plastics is placed in the category, "Welding by Movement", in the process group, Pressure Joint Welding. The melting of the material occurs, in such case, through a high-frequency mechanical oscillation of up to 40 kHz, by means of ultrasound. Also metals can be connected with one another by ultrasonic welding.

During ultrasonic welding, a high-frequency electrical voltage of up to 40 kHz is produced by a generator from the grid voltage for operating a converter. Predominantly, piezoelectric transducers are used as converter. The converter transduces the electrical voltage into sound waves propagating in a solid body, which are changed in their acoustic amplitude by a so-called booster, and are transmitted on a sonotrode as actual welding tool. In such case, a pressing-advancing unit presses the oscillatory unit with the sonotrode against the weld location. In this way there is produced under a predetermined compressive pressure a longitudinal oscillatory movement, which melts the weld location through a high-frequency, hammer-like working of the joint. The introduction of energy into the joint zone is, in such case, assured by so-called energy directors. For such purpose, the joint zone is, for example, provided with roof-shaped weld lips or embodied as a mash joint.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
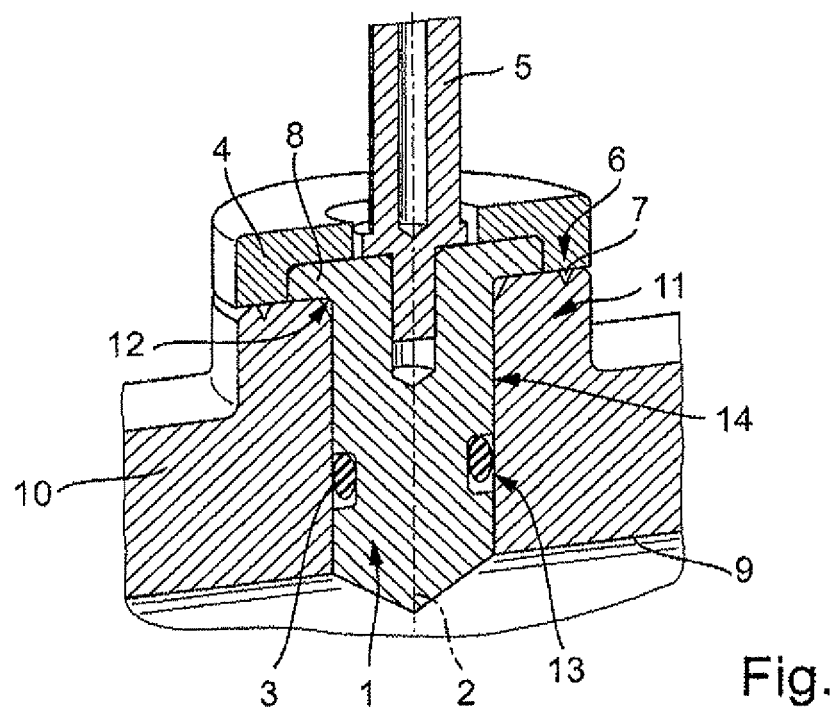
FIG. 1 is a cross section through an electrode arrangement of a magneto-inductive flow measuring device of the invention.

FIG. 1 shows a cross section through an electrode arrangement of a magneto-inductive flow measuring device. The electrode 1 is inserted in a bore 14 into the wall of a measuring tube 10, and includes an electrode shank and an electrode head at least partially wetted by the measured substance in measurement operation. The electrode head has a conical shape in the region in which it protrudes inwardly into the barrel of the measuring tube. In the region of the bore 14, the electrode shank has a cylindrical basic form. Moreover, in the region of the electrode shank, a radial cavity 13 is provided, which contains an O-ring 3. The O-ring 3 protrudes slightly out from the cylindrical basic form of the electrode shank, so that O-ring 3 forms a first sealing stage, and seals the electrode 1 in the region of the bore 14. On the end facing away from the electrode head, the electrode 1 has a flange 8, with which the electrode 1 terminates. The flange 8 protrudes perpendicularly to the electrode longitudinal axis 2. Along the electrode longitudinal axis 2, the electrode 1 has, in the end facing away from the electrode head, a socket, into which a plug 5 is inserted. The plug 5 serves, in such case, for tapping the electrical potential measured by means of the electrode head in the measured substance.

The cylindrical bore 14 introduced into the measuring tube 10 is surrounded by a seat 11 in the form of a collar-like boss. Seat 11 is located on the outside of the measuring tube 10. The measuring tube 10 is, in such case, at least in the region the bore 14 and the seat 11, composed of plastic. The electrode shank is completely inserted into the bore 14. The electrode 1 lies with its flange 8 on a planar area which marks the terminus of the seat 11. The bearing surface of the flange 8 extends perpendicular to the electrode longitudinal axis 2, and parallel to the longitudinal axis of the measuring tube 10. Over the flange 8 of the electrode 1, a cap 4 is placed, which contacts the seat 11. Cap 4 is connected by a plastic-welding method with the seat 11.

Furthermore, cap 4 includes a central opening along the longitudinal axis 2 of the electrode, through which the electrode 1 is electrically connected by a plug 5. The potential tapped in such case by the electrode 1 is transmitted to a measuring and/or operating circuit (not shown). From the electrical potential, a voltage proportional to the flow is derived, and flow is determined therefrom.

The measuring tube 10 is surrounded, at least in the region of the electrodes 1, by a housing (not shown). The measuring tube 10, which is under a process pressure and through which the measured substance flows, is sealed to pressure and sealed to liquid in the region of the electrode shank by a first sealing stage, composed of a radially arranged O-ring 3. The O-ring 3 has the required physical and chemical properties, which are necessary for use in typical measured substances, such as, for example, drinking water and waste water. Furthermore, the O-ring 3 is specially designed for use in association with materials composed of plastic.

Bore 14 is enlarged conically in its end region, so that a cavity 12 exists between the electrode 1 and the bore 14. This cavity 12 lies directly below the flange 8 of the electrode 1. A second sealing and/or insulating element (not shown) can be placed in the cavity 12.

The cap 4 applied on electrode 1 and seat 11 has, along the joint zone 6 on the seat 11, a weld lip 7. The weld lip 7 has a roof-shaped cross section, and is melted in a material-bonding manner with the seat 11. In this way, the bore 14 is sealed to pressure and to liquid.

Figure 2:
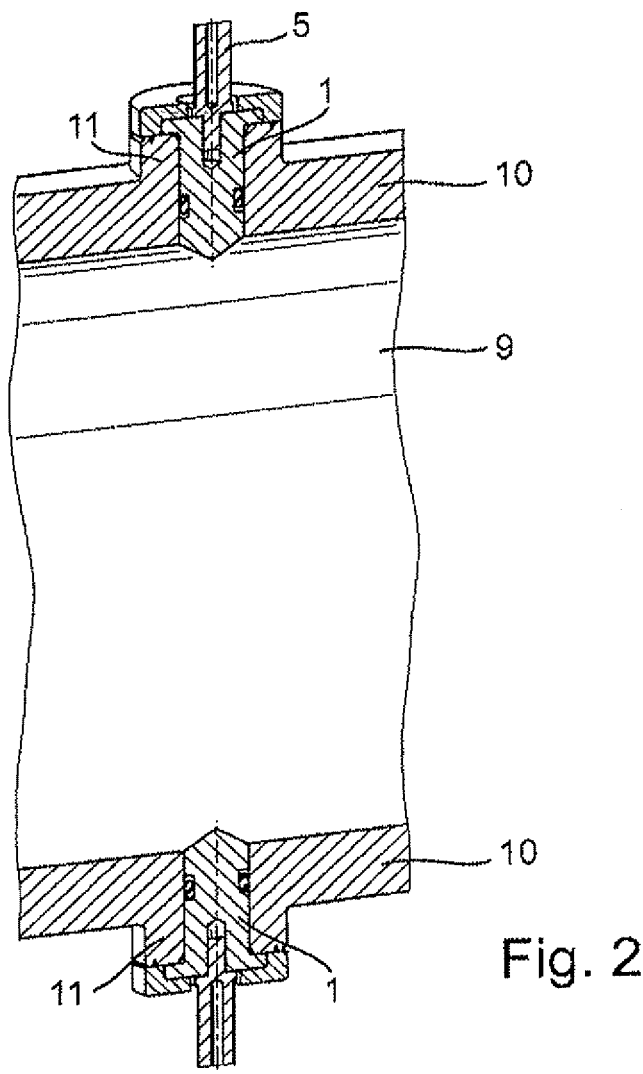
FIG. 2 is a cross section through the longitudinal axis of a measuring tube in the region of the measuring electrodes of the magneto-inductive flow measuring device of the invention.

FIG. 2 shows two measuring electrodes of a magneto-inductive flow measuring device of the invention inserted into a measuring tube 10 diametrally opposed on either side of the longitudinal axis. Electrodes 1 are, as shown in FIG. 1, inserted into the measuring tube 10. In the case of the magneto-inductive flow measuring device of the invention, and through the method for its manufacture, the electrodes 1 are permanently inserted perpendicular to the longitudinal axis of the measuring tube 10, in a manner so as to seal it to pressure and to liquid. By means of ultrasonic welding, the electrodes 1 are surrounded by the measuring tube 10—which, at least in the illustrated region, is composed of plastic—and, in the region of the electrode shank and in the region of the end facing away from the electrode head, are enclosed therein. Solely the electrode head wetted by the measured substance in measurement operation and the plug 5 for tapping the measured electrical potential are not embedded in the measuring tube 10.

Figure 3:
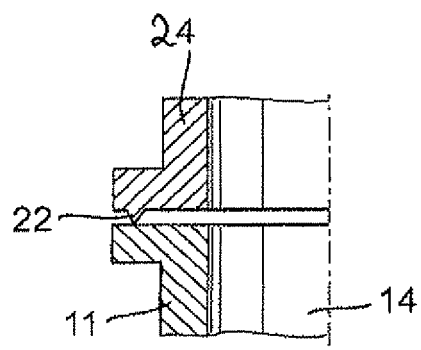
FIGS 3 and 4 show two schematic representations of different joint zones
Figure 4:
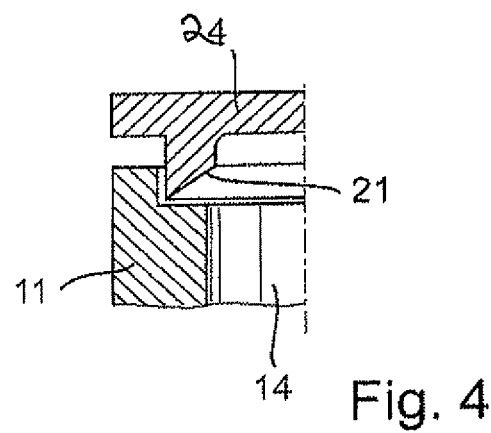

FIG. 3 shows a weld lip 22 and FIG. 4 a mash joint 21. The weld lip 22 in FIG. 3 has a roof-shaped cross section. In the welding process, the weld lip 22 melts in the region of the joint zone 6 of the seat 11. In this way, a material-bonded connection arises between the securement means 24 and the measuring tube 10.

FIG. 4) shows a so-called mash joint 21. The mash joint 21 forms a connection between the securement means 24 and the seat 11. For such purpose, the bore 14 has in its end region an enlarged radius, which extends into the wall of the measuring tube 10 or the seat 11. The space arising from the enlarged radius contains a ridge of the securement means 24. The ridge has an incline of about 30° relative to a line perpendicular to the longitudinal axis of the bore 14. Through plastics welding technology, the ridge is connected with the seat in a material-bonding manner.

The sharp ridge in the case of the mash joint, and the roof-shaped cross section in the case the weld lip form energy directors, in order to prevent disadvantageous, superficial welding. Additionally, the welding time is shortened thereby.

The invention claimed is:

1. A magneto-inductive flow measuring device having a measuring transducer, wherein the measuring transducer comprises:
    a measuring tube, through which a measured substance can flow;
    a magnet system for producing a magnetic field;
    at least one electrode inserted into the measuring tube for registering an electrical voltage; and
    a securement means, which serves for securing said at least one electrode to said measuring tube, wherein:
    said securement means is at least partially composed of plastic, and said measuring tube is at least partially composed of plastic, both securement means and said measuring tube forming plastic portions;and
    said securement means is connected to said measuring tube at their plastic portions, by plastics welding joints produced by a plastic welding technology.

2. The magneto-inductive flow measuring device as claimed in claim 1, wherein:
    said at least one electrode has a flange, with which said at least one electrode lies against said measuring tube.

3. The magneto-inductive flow measuring device as claimed in claim 2, wherein:
    said measuring tube has a bore surrounded by a seat; and
    said at least one electrode is inserted into the bore.

4. The magneto-inductive flow measuring device as claimed in claim 3, wherein:
    said flange of said at least one electrode lies at least partially on said seat.

5. The magneto-inductive flow measuring device as claimed in claim 3, wherein:
    said securement means is connected with said seat.

6. The magneto-inductive flow measuring device as claimed in claim 2, wherein:
    said securement means lies at least partially on the flange of said at least one electrode.

7. The magneto-inductive flow measuring device as claimed in claim 1, wherein:
    the plastics welding technology involves one of the following technologies: ultrasonic, resistance, stud, laser, electron beam, friction and/or heat welding technology.

8. The magneto-inductive flow measuring device as claimed in claim 1, wherein:
    said securement means is embodied in such a manner, that, by said securement means, said at least one electrode is arranged in a desired position.

9. The magneto-inductive flow measuring device as claimed in claim 1, wherein:
    said at least one electrode has at least one sealing element, which seals said measuring tube in the region of the bore.

10. The magneto-inductive flow measuring device as claimed in claim 9, wherein:
    said at least one electrode has an electrode head and an electrode shank, and that said sealing element is partially inserted in a cavity of said electrode shank.

11. The magneto-inductive flow measuring device as claimed in claim 9, wherein:
    said at least one weld lip and/or a mash joint is provided on said securement means and/or said measuring tube; and
    said weld lip and/or the mash joint serves to affix said securement means to said measuring tube.

* * * * *